United States Patent [19]

Yamashita et al.

[11] 3,910,998

[45] Oct. 7, 1975

[54] PROCESS FOR PREPARATION OF SUBSTANTIALLY REFINED METHYLTEREPHTHALIC ACID AND/OR 4-METHYLISOPHTHALIC ACID

[75] Inventors: Gentaro Yamashita; Takeshi Fujii; Noritsugu Saiki, all of Iwakuni, Japan

[73] Assignee: Teijin Limited, Osahu, Japan

[22] Filed: Apr. 12, 1971

[21] Appl. No.: 133,431

[52] U.S. Cl. ............................................. 260/525
[51] Int. Cl.² ..................................... C07C 51/42
[58] Field of Search ................................. 260/525

[56] References Cited
UNITED STATES PATENTS

| | | | |
|---|---|---|---|
| 3,171,856 | 3/1965 | Kurtz | 260/525 |
| 3,253,024 | 5/1966 | Bohrer et al. | 260/525 |
| 3,364,256 | 1/1968 | Ichikawa et al. | 260/525 |
| 3,646,125 | 2/1972 | Berthoux et al. | 260/525 |

Primary Examiner—John F. Terapane
Attorney, Agent, or Firm—Sherman & Shalloway

[57] ABSTRACT

A process for the preparation of a substantially refined methylbenzene dicarboxylic acid selected from methylterephthalic acid and 4-methylisophthalic acid, which comprises mixing a solid crude product of at least one methylbenzene dicarboxylic acid selected from the group consisting of methylterephthalic acid and 4-methylisophthalic acid, which is obtained by oxidizing pseudocumene with molecular oxygen in the presence of a cobalt catalyst, with acetic acid or an aqueous solution of acetic acid in an amount sufficient to dissolve the methylbenzene dicarboxylic acid substantially therein, the water content of the aqueous solution of acetic acid being up to 40 % by weight; thus dissolving the methylbenzene dicarboxylic acid in acetic acid or the aqueous solution of acetic acid at a temperature of 80°–220°C. while leaving substantially in the undissolved state impure coloring materials contained in the solid crude product; separating the undissolved solids from the resulting liquid while maintaining the temperature at 80°–220°C.; and recovering the methylbenzene dicarboxylic acid in the form of solids from the remaining solution.

6 Claims, No Drawings

PROCESS FOR PREPARATION OF SUBSTANTIALLY REFINED METHYLTEREPHTHALIC ACID AND/OR 4-METHYLISOPHTHALIC ACID

This invention relates to a process for the purification of crude methylterephthalic acid and/or crude 4-methylisophthalic acid. More specifically, it relates to a process for preparing refined methylterephthalic acid and/or 4-methylisophthalic acid from crude methylterephthalic acid and/or crude 4-methylisophthalic acid obtained by oxidizing pseudocumene, i.e., 1,2,4-trimethylbenzene, in the presence of a cobalt catalyst.

In this specification, the term "methylbenzene dicarboxylic acid" encompasses "methylterephthalic acid and/or 4-methylisophthalic acid."

Methylbenzene dicarboxylic acid is a peculiar aromatic dibasic acid, and is a substance industrially valuable as a starting material for the manufacture of unsaturated polyesters and alkyd resins and for the preparation of plasticizers for synthetic resins as vinyl chloride resins.

It has been known that methylbenzene dicarboxylic acid is obtained by oxidizing pseudocumene under specific conditions. For instance, in the specification of U.S. Pat. No. 3,008,983, a process comprising oxidizing pseudocumene with molecular oxygen in an acetic acid solvent with use as catalyst consisting of a methylenic ketone such as methylethylketone and a cobalt compound is described.

As the method of recovering methylbenzene dicarboxylic acid from the reaction mixture obtained by such oxidation process, a process comprising cooling the reaction mixture to thereby precipitate methylbenzene dicarboxylic acid as solids by utilizing the fact that the solubility of the methylbenzene dicarboxylic acid in acetic acid is low, separating the solids by a conventional solid-liquid separation means such as filtration, and washing the recovered solids with water according to need has been known.

The solids of the intended methylbenzene dicarboxylic acid recovered by the above process frequently contains as impurities oxidation intermediates and by-products such as dimethylbenzoic acids, aldehydes and trimellitic acid, impure coloring substances of unknown structures, and a portion of the catalyst incorporated in the product.

In the industrial manufacture of methylbenzene dicarboxylic acid by the above-mentioned process of the oxidation of pseudocumene, it is advantageous to recycle to the oxidation reaction a filtrate left after the recovery of the solid precipitates of the methylbenzene dicarboxylic acid. In this case, however, there is a tendency that contents of above-mentioned impurities are further increased in the recovered solids of the intended methylbenzene dicarboxylic acid.

The solid methylbenzene dicarboxylic acid obtained by the above procedures conducted on an industrial scale is colored in from yellow or pink to violet and in extreme cases it colored in dark green. In general, it is difficult to effectively remove impurities causing such coloration in the product, and no process capable of removing such impure coloring substances from the product efficiently is yet known.

In view of the foregoing, attempts have been made to refine crude methylbenzene dicarboxylic acid obtained by the above mentioned process of the oxidation of pseudocumene, by washing it with various organic solvents, water or mixtures thereof, but it has been found that a sufficient removal of impurities cannot be attained by any of such procedures.

Accordingly, detailed research has been made on impure coloring materials which are contained in crude methylbenzene dicarboxylic acid which are difficult to remove therefrom and as a result, it has been found that the impure coloring material whose removal is most difficult is a complex of the cobalt used as the catalyst and timellitic acid formed as a byproduct from pseudocumene, and that the above complex of cobalt and trimellitic acid and other coloring materials are not appreciably soluble in acetic acid or aqueous acetic acid at temperatures ranging from 80°to 220°C. while methylbenzene dicarboxylic acid is soluble in acetic acid or aqueous acetic acid in a substantial amount at temperatures within the above range.

The primary object of this invention is to provide a process for the preparation of refined methylbenzene dicarboxylic acid by removing impure coloring materials efficiently from crude methylbenzene dicarboxylic acid obtained by oxidizing pseudocumene with molecular oxygen in the presence of a cobalt catalyst.

In accordance with this invention, a process for the preparation of a substantially refined methylbenzene dicarboxylic acid selected from methylterephthalic acid and 4-methylisophthalic acid, which comprises mixing a solid crude product of at least one methylbenzene dicarboxylic acid selected from the group consisting of methylterephthalic acid and 4-methylisophthalic acid, which is obtained by oxidizing pseudocumene with molecular oxygen in the presence of a cobalt catalyst, with acetic acid or an aqueous solution of acetic acid in an amount sufficient to dissolve the methylbenzene dicarboxylic acid substantially therein, the water content of the aqueous solution of acetic acid being up to 40% by weight; thus dissolving the methylbenzene dicarboxylic acid in the acetic acid or the aqueous solution of acetic acid at a temperature of 80°–220°C. while leaving substantially in the undissolved state impure coloring materials contained in the solid crude product; separating undissolved solids from the resulting liquid while maintaining the temperature at 80°– 220°C.; and recovering the methylbenzene dicarboxylic acid in the form of solids from the remaining solution.

This invention will now be detailed.

The process of this invention is applied to any crude methylbenzene dicarboxylic acid obtained by oxidizing pseudocumene with molecular oxygen in the presence of a cobalt catalyst. For instance, the crude methylbenzene dicarboxylic acid to be used as the starting material in the process of this invention is prepared by oxidizing pseudocumene at 100° – 130°C. and 5 – 20 atmospheres with molecular oxygen such as air in an acetic acid solvent of an amount 2 – 10 times as large as that of pseudocumene based on weight in the presence of more than 0.1% by weight based on acetic acid of a cobalt salt of an organic acid such as cobalt acetate or cobalt naphthenate; and thereafter cooling the reaction product mixture to low temperatures, for example, room temperature. In the above oxidation reaction it is possible to use as a promotor more than 1% by weight based on the acetic acid of a methylenic ketone such as methylethylketone, cyclohexanone and diethyl ketone, an aldehyde such as acetaldehyde, para-aldehyde and benzaldehyde, or a bromine donor such as $Br_2$ , ammonium bromide, sodium bromide, cobalt bromide, manganese bromide and hydrobromic acid.

A starting material particularly suitable for the treatment of the process of this invention is a crude methylbenzene dicarboxylic acid obtained by oxidizing pseudocumene in the liquid phase with molecular oxygen in the presence of the above-mentioned cobalt catalyst alone or in combination with a promotor selected from methylenic ketones and aldehydes.

The so formed solid crude methylbenzene dicarboxylic acid may be used in the process of this invention as it is separated from the reaction mixture or after it has been washed with water, acetic acid, an aqueous solution of acetic acid or other solvent. In this invention it is also possible to use as the starting material a slurry of the solid crude methylbenzene dicarboxylic acid in acetic acid or an aqueous solution of acetic acid.

The composition of the solid crude methylbenzene dicarboxylic acid obtained by the oxidation of pseudocumene with molecular oxygen in the presence of a cobalt catalyst varies to some extent depending on preparation conditions. One example of the composition of such solid crude methylbenzene dicarboxylic acid is as follows:

| | |
|---|---|
| dimethylbenzoic acid | 1 – 20 % by weight |
| methylterephthalic acid | 40 – 50 % by weight |
| 4-methylisophthalic acid | 30 – 40 % by weight |
| trimellitic acid | 3 – 8 % by weight |
| aldehydes | 1 – 3 % by weight |
| cobalt | 0.5 – 3 % by weight |

Although the process of this invention is particularly effective for removing impure coloring materials from a mixture of methylterephthalic acid and 4-methylisophthalic acid, it must now be noted that the process of this invention may be applied to the crude product from which either of methylterephthalic acid and 4-methylisophthalic acid has been separated.

According to this invention, a solid crude product of at least one methylbenzene dicarboxylic acid selected from methylterephthalic acid and 4-methylisophthalic acid is mixed at a temperature of 80° – 220°C. with acetic acid or an aqueous solution of acetic acid in an amount sufficient to dissolve the methylbenzene dicarboxylic acid substantially therein. By this operation the methylbenzene dicarboxylic acid is dissolved in the acetic acid or the aqueous solution thereof while impure coloring materials such as a cobalt complex of trimellitic acid are suspended in the form of solid fine particles and in the substantially undissolved state in the methylbenzene dicarboxylic acid solution.

From the results of analysis it has been confirmed that the main component of impure coloring materials made present in the form of solid particles undissolved in acetic acid or an aqueous solution of acetic acid under the above conditions is a complex where cobalt and trimellitic acid are bonded at a molar ratio of about 1:1. A complex salt synthesized from cobalt and trimellitic acid at a molar ratio of 1:1 by an ordinary method is considerably soluble in acetic acid or an aqueous solution of acetic acid. Accordingly, it is quite surprising that the cobalt complex of trimellitic acid contained in the abovementioned oxidation reaction product is substantially insoluble in acetic acid or an aqueous solution of acetic acid under the abovementioned temperature condition.

Acetic acid or an aqueous solution is used as the solvent in the process of this invention. In the case of an aqueous solution of acetic acid, it is essential that the acetic acid concentration is higher than 60% by weight (the water content of up to 40% by weight), preferably higher than 70% by weight. When the acetic acid concentration is lower than the above lower limit, the solubility of the methylbenzene dicarboxylic acid is lowered, with the result that the amount of solvent required for the treatment must be increased. Accordingly, from the economical viewpoint it is not preferable to use an aqueous solution of acetic acid of such low acetic acid concentration. When only acetic acid is used as the solvent, the solubility of the cobalt complex of trimellitic acid in the solvent is high at high temperatures, as compared with the case of an aqueous solution of acetic acid, and therefore, the purification efficiency is a little lower than in the case of the aqueous solution of acetic acid. In view of the foregoing, in the process of this invention it is most preferable to use as the solvent an aqueous solution of acetic acid of an acetic acid concentration of 80 – 95 % by weight (a water content of 5 –°20by weight).

According to the process of this invention, the solid crude methylbenzene dicarboxylic acid is mixed with acetic acid or an aqueous solution of acetic acid at a temperature ranging from 80°to 220°C., preferably from 100° to 190°C. When the temperature is lower than 80°C., the solubility of the methylbenzene dicarboxylic acid in acetic acid or an aqueous solution of acetic acid is low, and therefore, it is necessary to use the solvent in a great amount. Accordingly, in such case, the recovery ratio of the methylbenzene dicarboxylic acid is lowered and, since the undissolved solids of impure coloring materials are in the state diluted with a great amount of acetic acid or an aqueous solution of acetic acid, the operation of separating undissolved solids of impure solid materials becomes troublesome, though not difficult. At temperatures exceeding 220°C., a tendency appears that the solubility of impure coloring materials such as a cobalt complex of trimellitic acid in acetic acid or an aqueous solution of acetic acid increases, with the result that a high refining effect cannot be expected. Further, if the operation is effected at a high temperature, it is necessary to maintain the system at a high pressure so as to maintain the liquid state and undesired corrosion of equipment occurs. For these reasons, it is not preferable to conduct the operation at temperatures exceeding the above range. In view of the foregoing, in the process of this invention temperatures ranging from 110°to 180°C. are most preferred for the actual operation.

The amount of acetic acid or an aqueous solution of acetic acid used differs to some extent depending on the temperature at which the crude methylbenzene dicarboxylic acid is mixed with such solvent. However, it is sufficient that the solvent is used in an amount sufficient to dissolve substantially therein the methylbenzene dicarboxylic acid contained in the crude oxidation reaction product, for instance, in an amount 2 – 40 times as large as the amount of the methylbenzene dicarboxylic acid on a weight basis, preferable amounts being 5 – 20 times as large as that of the methylbenzene dicarboxylic acid on a weight basis. Of course, when the solvent is used in an amount a little greater or lesser than the above, the object of purification can be attained to some extent. However, when the amount of solvent is too small or great, such disadvantages as lowering of the recovery ratio of the methylbenzene dicarboxylic acid obtained from the solution phase and reduction of purification efficiency. Accordingly, it is not preferred that the solvent is used in too great or too small an amount.

The solubility of the methylbenzene dicarboxylic acid varies depending on not only the temperature and the water content of the solvent but also the mixing ratio of methylterephthalic acid and 4-methylisophthalic acid, the amounts of reaction by-products such as dimethylbenzoic acid isomers and other impurities, and other factors. Thus, it is difficult to determine the solubility readily based on one factor or another. However, it is possible to know the solubility required for the practice of the process of this invention by conducting a model experiment, for instance, by predetermining the temperature and the water content of the solvent to be adopted in conducting the process, adding typical impurities such as dimethyl benzoic acid and trimellitic acid to a mixture of methylterephthalic acid and 4-methylisophthalic acid at the same mixing ratio as that of methylterephthalic acid and 4-methylisophthalic acid in the crude methylbenzene dicarboxylic acid product to be purified, adding thereto the solvent and measuring the solubility by an ordinary solubility measuring method. Particularly, when the contents of dimethylbenzoic acid and trimellitic acid are low in the crude methylbenzene dicarboxylic acid, the solubility of the methylbenzene dicarboxylic acid can be regarded as being identical with the value calculated based on the assumption that there is no reciprocal action between the solubility of methylterephthalic acid and 4-methylisophthalic acid. Solubilities of methylterephthalic acid and 4-methylisophthalic acid in a mixed solvent consisting of 90% by weight of acetic acid and 10% by weight of water, are shown in Table 1 given below. From these data the solubility of the methylbenzene dicarboxylic acid can be calculated. For instance, the solubility of a methylbenzene dicarboxylic acid composed of 60% of methylterephthalic acid and 40% of 4-methylisophthalic acid in the above mixed solvent at 100°C. is determined in the following manner:

As is seen from Table 1, the solubility of methylterephthalic acid is 1.5 and that of 4-methylisophthalic acid is 2.0. Thus, at the point when methylterephthalic acid is dissolved to its saturation solubility, 4-methylisophthalic acid is deemed to have completely been dissolved in the solvent. Therefore, the solubility of the methylbenzene dicarboxylic acid as a whole is determined to be 2.5 as shown in the following equation:

$$1.5 \times 40/60 + 1.5 = 2.5$$

The measured value is about 2.8 and a little higher than the above calculated value. However, the temperature error and other observation errors being taken into consideration, such calculated value is sufficiently reliable as the assumption value.

Table 1

Solubilities of methylterephthalic acid and 4-methylisophthalic acid in mixed solvent of 90 g of acetic acid and 10 g of water

| Temperature (°C) | Solubility (g) | |
|---|---|---|
| | methylterephthalic acid | 4-methylisophthalic acid |
| 20 | 0.18 | 0.52 |
| 60 | 0.53 | 1.0 |
| 100 | 1.5 | 2.0 |
| 140 | 4.5 | 3.8 |
| 180 | 13 | 7.8 |

The specific amount of acetic acid or an aqueous solution of acetic acid to be used in the process of this invention may be readily determined in view of the above explanation and the data shown in Table 1.

When the reaction mixture slurry containing solids of crude methylbenzene dicarboxylic acid resulting directly from the oxidation of pseudocumene is used as the starting material in the process of this invention, since a part of the methylbenzene dicarboxylic acid is dispersed in the solid state in the reaction mixture together with acetic acid, the above-mentioned liquid system suitable for the treatment of the process of this invention is prepared by dissolving the substantial amount of the methylbenzene dicarboxylic acid in the oxidation reaction mixture liquor by elevating the temperature thereof above the oxidation reaction temperature and, if required, adding a prescribed amount of acetic acid or an aqueous solution of acetic acid to the reaction mixture liquor.

In accordance with this invention, a solution of the methylbenzene dicarboxylic acid containing impure coloring materials such as a cobalt complex of trimellitic acid in the form of undissolved solids suspended in the solution is obtained. The impure coloring materials are then separated from the solution phase while the temperature of the mixture is maintained within the above range, namely within a range of from 80° to 220°C. The separation of undissolved solids may be accomplished by known solid-liquid separation techniques. In this invention, it is preferred that this separation is conducted by passing the methylbenzene dicarboxylic acid solution containing undissolved impurities in the suspended state through a filtering layer which does not substantially allow particles having a size greater than 10 microns to pass therethrough. The use of a filtering layer which substantially allows only particles of a size less than 1 micron to pass therethrough is especially preferred because the use of such fine filtering layer gives a methylbenzene dicarboxylic acid excellent in whiteness. On the other hand, if the separation of impure coloring materials such as a cobalt complex of trimellitic acid is effected by a conventional filtration or centrifugal precipitation technique, it si relatively difficult to remove substantial amounts of undissolved solids of impure coloring materials. The reason is that since impure coloring materials are present in the form of fine particles in many cases, they tend to pass through an ordinary filtering medium.

Any optional filtering layer may be used in this invention, as long as it does not substantially allow particles of a size greater than 10 microns to pass therethrough. For instance, filtering media of porous metal or porous glass of a pore size of 2 – 5 microns prepared by sintering metal powder may be used or glass powder. Further, the separation may be accomplished by passing the above-mentioned liquor through a filtering medium on which a filter aid such as diatomeceous earth, active carbon, fuller's earth and activated clay has been precoated (precoating method) or by mixing such filter aid with the methylbenzene dicarboxylic acid solution containing impure coloring materials and then pasing the liquid mixture through an ordinary filtering medium (body-feed filtration).

In this invention, it is essential that the temperature of the liquor should be maintained at 80° – 220°C., preferably 110° – 180°C., during the above-mentioned filtering operation, whereby it is possible to effectively remove undissolved solids of impure coloring materials and transfer the methylbenzene dicarboxylic acid effectively into the filtrate. Further, it is necessary that during the filtering operation the pressure should be such that the system will be kept in the liquid state, and it is desired that the liquid is maintained under elevated pressure during the filtering operation, because the pressurization of the liquor makes the filtering operation very easy.

Of course, in this invention the means for removing fine impure coloring materials are not limited to those described above, but any method capable of separating and removing fine particles may be adopted in this invention.

According to this invention, the methylbenzene dicarboxylic acid solution from which insoluble solids of impure coloring materials have been removed, is then subjected to the treatment of recovering the methylbenzene dicarboxylic acid in the form of solids. For this recovery it is preferable to cool and/or condense the above solution to precipitate the methylbenzene dicarboxylic acid. The method of precipitating the methylbenzene dicarboxylic acid only by cooling is particularly preferable for removing the remainder of dimethylbenzoic acids, aldehydes and other substances left behind in the filtrate. It is possible to remove all of the solvent from the filtrate and recover the intended methylbenzene dicarboxylic acid, but this method is not preferred because it is impossible to remove impurities easily soluble in the solvent and the purification effect, therefore, is lowered.

The precipitated methylbenzene dicarboxylic acid can be recovered by an ordinary solid-liquid separation technique, for instance, by filtration or centrifugal precipitation. A part or all of the solution left as the filtrate after the separation of the intended product may be used again as solvent for dissolving the crude product therein, but when such recycle of the solvent is conducted, it must be noted that accumulation of impurities easily soluble in the solvent sometimes occurs. The resulting methylbenzene dicarboxylic acid may be used as an end product as it is recovered, but in case a methylbenzene dicarboxylic acid product of a higher purity is desired, the resulting methylbenzene dicarboxylic acid may be further purified by an optional method. For instance, when the methylbenzene dicarboxylic acid obtained by practising the process of this invention is merely washed with acetic acid, water or an aqueous solution of acetic acid, a methylbenzene dicarboxylic acid product of a high purity and excellent in whiteness can be obtained. It has been found that such purification may be conveniently accomplished by a method comprising adding to the solid methylbenzene dicarboxylic acid recovered by the above-described process, acetic acid or an aqueous solution of acetic acid in an amount about 2 – 5 times as great as that of the benzene dicarboxylic acid, heating the mixture at a temperature of 160° – 200°C. and cooling the same. According to this purification method, impurities which can not be removed by the above-described process, can be completely removed, whereby a methylbenzene dicarboxylic acid product of much higher purity can be obtained. On the other hand, if the crude oxidation reaction mixture is washed with acetic acid, water or an aqueous solution of acetic acid under atmospheric or elevated pressure without subjecting it to the treatments according to this invention, methylbenzene dicarboxylic acid having a whiteness comparable to that of the product of this invention cannot be obtained, which will be readily clear from the description given hereinbelow.

The solid insoluble matters separated from the methylbenzene dicarboxylic acid solution comprise great amounts of trimellitic acid and cobalt. Therefore, these valuable compounds can be recovered easily from such solids. Accordingly, the process of this invention can also be a process for the recovery of trimellitic acid and cobalt.

As detailed hereinabove, the process of this invention makes it possible to effectively remove and separate, by relatively simple operations, difficulty-removable impure coloring materials such as a cobalt complex of trimellitic acid from the crude impure methylbenzene dicarboxylic acid obtained by oxidizing pseudocumene with molecular oxygen in the presence of a cobalt catalyst, and to obtain a methylbenzene dicarboxylic acid product of a very low impurity content and excellent in whiteness.

This invention will now be detailed by referring to examples, in which "parts" indicates "parts by weight" and the coloration degree is expressed in terms of "ammonia OD" (ammonia optical density), because the coloring materials to be removed by the process of this invention are relative to the value called "ammonia OD" (determined by dissolving 1 g of a sample in 10 cc of 7% aqueous ammonia and measuring the absorbancy at a wavelength of 370 m$\mu$ and a cell thickness of 1 cm).

EXAMPLE 1

The oxidation of pseudocumene was conducted by adding 20 parts of pseudocumene to a mixture of 80 parts of acetic acid, 4.0 parts of cobalt acetate tetrahydrate and 4 parts of methylethylketone and maintaining the mixture at 120°C. and 10 atmospheres while passing air therethrough. The resulting reaction mixture was cooled and the precipitated solids were separated. The remaining liquor was subjected to distillation to remove water therefrom. Them, pseudocumene, methylethylketone and cobalt acetate tetrahydrate were added to the remaining liquor, their proportions being almost identical with that in the first charge, and then the oxidation reaction was conducted again in the same manner as above. At this operation, the amount of dimethylbenzoic acids contained in the reaction liquor was converted to that of pseudocumene, and the amount of pseudocumene added was determined by reducing an amount corresponding to the amount of dimethylbenzoic acid.

The above oxidation was repeated 12 times in total. The resulting reaction mixture comprised 8.12% of methylbenzene dicarboxylic acid, 0.92% of trimellitic acid, 0.75% of cobalt calculated as metal and 16.2% of dimethylbenzoic acids. The methylbenzene dicarboxylic acid consisted of 56% of methylterephthalic acid and 44% of 4-methylisophthalic acid.

150 Parts of acetic acid of a water content of 10% were added to 100 parts of the resulting reaction mixture, and the mixture was heated at 120°C. The resulting liquor was passed through a wire gauge of 2000 mesh and a sintered metal filter of a pore size of 2 microns to effect the filtration. During the filtration, the temperature of the liquor was maintained at 120°C.

The resulting filtrate was cooled and the precipitated solids were separated. To the separated solids 30 parts of acetic acid of a water content of 10% were added, and the mixture was stirred at 100°C. for 20 minutes and cooled to 20°C. The solids were separated. The so recovered solids were washed again with 30 parts of acetic acid of a water content of 10% in the same manner as above. The resulting solids were dried. As a result 6.0 parts of methylbenzene dicarboxylic acid were obtained. The results of the analysis of the product are shown in Table 2 (Example 1-a).

25 Parts of solids obtained by filtering the oxidation reaction mixture at 20°C. (solids contained 44% of volatile components) were mixed with 175 parts of acetic acid of a water content of 10%, and the mixture was heated at 120°C. At this temperature the resulting liquor was passed through a wire gauge of 2000 mesh and a sintered metal filter of a pore size of 2 microns to effect the filtration. The filtrate was cooled and the precipitated solids were separated. To the so separated solids 30 parts of acetic acid of a water content of 10% were added, and the mixture was stirred at 100°C. for 20 minutes and cooled to 20°C. The precipitated solids were separated. To the so separated solids 30 parts of acetic acid of a water content of 10% were added, and the washing was carried out in the same manner as above. The resulting solids were dried. As a result 5.9 parts of methylbenzene dicarboxylic acid were obtained. Results of the analysis of the product are shown in Table 2 (Example 1-b).

COMPARATIVE EXAMPLE 1

50 Parts of acetic acid of a water content of 10% were added to 23 parts of solids obtained by filtering at 20°C. the oxidation reaction mixture prepared in Example 1 (solids contained 46% of volatile components) and the mixture was stirred at 120°C. for 30 minutes. Then, the mixture was cooled to 20°C. directly without filtration, and the precipitated solids were separated. They were washed twice with use of 30 parts of acetic acid of a water content of 10% in the same manner as in Example 1. The resulting solids were dried to obtain 5.8 parts of methylbenzene dicarboxylic acid. Results of the analysis of the product are shown in TAble 2. From these results it is seen that the product contained trimellitic acid and cobalt in higher contents and that it was greatly colored.

Table 2

| Example | Ammonia OD value | Trimellitic acid content (% by weight) | Cobalt content (p.p.m.) | Methylbenzene dicarboxylic acid content (% by weight) |
|---|---|---|---|---|
| 1-a | 0.138 | 0.48 | 96 | 97.8 |
| 1-b | 0.109 | 0.25 | 74 | 98.6 |
| Comparative Example 1 | (0.72×10)* | 4.08 | 1930 | 93.2 |

Note:
*The measurement was impossible by the method adopted in this invention; therefore, the measurement was conducted after diluting the sample liquor 10 times.

The solids left on the sintered metal filter were dried and analyzed. Thus it was found that in these solids the cobalt atom and the trimellitic acid molecule were present at a ratio of about 1:1 and other components were only traces.

EXAMPLE 2

A mixture of 1 part of pseudocumene, 10 parts of glacial acetic acid and 1 part of cobalt acetate tetrahydrate was continuously fed to an oxidation vessel where the oxidation of pseudocumene was continuously conducted at 110°C. and 10 atmospheres while blowing in air thereinto. The reaction mixture was continuously withdrawn and cooled. The precipitated solids were separated and water formed by the reaction was removed by distillation. Then, acetic acic, cobalt acetate and pseudocumene were added to the remaining liquor such that the original proportion would be restored, and the oxidation of pseudocumene was conducted in the same manner as above. The above oxidation was repeated 5 times in total. The separated solids (found to contain 47.8% of acetic acid and water) were gathered and they were mixed with acetic acid of a water content of 10% in an amount of 2 parts per part of the solids, and the mixture was heated and stirred at 100°C. for 30 minutes, and then it was cooled. The precipitates were recovered by filtration, and were added to acetic acid of a water content of 10% in an amount of 3 parts per part of the precipitates. Then, the mixture was heated at 200°C. for 30 minutes in a nitrogen atmosphere and cooled again. The resulting precipitates were recovered by filtration and dried.

The dried product comprised 88.7% of methylbenzene dicarboxylic acid (composed of 68% of methylterephthalic acid and 32% of 4-methylisophthalic acid), 9.4% of trimellitic acid, 0.6% of dimethyl benzoic acids and 2.6% of cobalt.

The following treatments were conducted by employing as the starting material the crude methylbenzene dicarboxylic acid of the above composition:

10 Parts of the starting crude product were mixed with a mixed solvent of acetic acid and water varying in the mixing ratio as indicated in Table 3 below, and the mixture was maintained at 100°C. for 30 minutes and passed through a diatomaceous earth layer of a thickness of about 1 cm to effect the filtration. The filtrate was cooled to 20°C. and the precipitated solids were recovered. The solids were washed with 10 parts of the same mixed solvent of acetic acid and water and then dried. Results of the analysis of the dried product are shown in Table 3.

Table 3

| Acetic acid/water ratio | Amount of solvent (parts) | Recovery ratio of methylbenzene dicarboxylic acid | Purity of recovered methylbenzene dicarboxylic acid (%) | Content of trimellitic acid (%) | Cobalt content (p.p.m.) | Ammonia OD value |
| --- | --- | --- | --- | --- | --- | --- |
| 100/0 | 270 | 79.5 | 98.8 | 0.31 | 900 | 0.182 |
| 90/10 | 310 | 74.9 | 99.0 | 0.12 | 350 | 0.155 |
| 80/20 | 350 | 72.6 | 99.1 | 0.10 | 290 | 0.135 |
| 70/30 | 390 | 69.8 | 99.1 | 0.10 | 280 | 0.128 |
| 60/40 | 450 | 64.7 | 98.6 | 0.35 | 420 | 0.158 |

EXAMPLE 3

10 Parts of the same starting material as used in Example 2 were maintained at 190°C. for 1 hour together with 40 parts of acetic acid of a water content of 10% in a nitrogen atmosphere, and at this temperature the mixture was passed through a methylbenzene dicarboxylic acid layer of about 1 cm thickness. The filtrate containing methylbenzene dicarboxylic acid was cooled to 20°C. and the precipitated solids were separated by filtration. The solids were washed with 10 parts of acetic acid of a water content of 10%, dried and analyzed. The weight of the dried product was 8.5 parts, and the product was found to contain 97.7% of methylbenzene dicarboxylic acid, 0.1% of dimethylbenzoic acids, 0.3% of teimellitic acid and 960 p.p.m. of cobalt. The ammonia OD value of the product was 0.228.

EXAMPLE 4

10.0 Parts of the same starting material as used in Example 2 were maintained at 80°C. for 1 hour together with 570 parts of a mixed solvent of 80% of acetic acid and 20% of water, and at this temperature the mixture was passed through an active carbon layer of about 1 cm thickness to effect the filtration. The filtrate was concentrated to have a total amount of 250 parts and cooled to 20°C. The precipitated solids were separated by filtration, and dried. The dried product weighed 5.5 parts, and as a result of the analysis, it was found to contain 96.4% of methylbenzene dicarboxylic acid, 0.1% of dimethylbenzoic acids, 0.28% of trimellitic acid and 820 p.p.m. of cobalt. The ammonia OD value of the product was 0.269.

EXAMPLE 5

The oxidation reaction was repeated 6 times in the same manner as in Example 2. The solids separated from the reaction mixture by the solid-liquid separation contained 51.4% by weight of acetic acid and water. The solids were mixed with 3 parts per part of the solids of acetic acid of a water content of 10%, and the mixture was stirred at 100°C. for 30 minutes and cooled to 20°C. The precipitated solids separated from the cooled mixture contained 35% of volatile components, and the ratio of methylterephthalic acid: 4-methylisophthalic acid contained in the solids was 61:39.

The above solids were used as the starting material.

150 Parts of acetic acid of a water content of 10% were added to 10 parts of the starting solids, and the mixture was heated at 130°C. and passed through a wire gauge of 2000 mesh and a sintered metal filter of a pore size of 2 microns to effect the filtration. The filtrate was cooled to 20°C., and the precipitated solids were separated, washed sufficiently with water and dried to obtain 5.4 parts of a methylbenzene dicarboxylic acid product. Results of the analysis of the product and starting material are shown in Table 4.

EXAMPLE 6

Example 5 was repeated by employing the same starting material as used in Example 5 and a sintered metal filter of a pore size of 5 microns instead of the sintered metal filter of a pore size of 2 microns, other operations being the same as in Example 5. Results of the analysis of the resulting methylbenzene dicarboxylic acid product are shown in Table 4.

EXAMPLE 7

Example 5 was repeated by employing the same starting material as used in Example 5, but without using the sintered metal filter of a pore size of 2 microns, other operations being the same as in Example 5. Results of the analysis of the resulting methylbenzene dicarboxylic acid are shown in Table 4.

COMPARATIVE EXAMPLE 2

The same starting material and purifying solvent as used in Example 5 were mixed together at the same ratio as in Example 5. The mixture was stirred at 130°C. for 30 minutes and then cooled to 20°C. The precipitated solids were separated and washed sufficiently with water in the same manner as in Example 5 to obtain 5.4 parts of a methylbenzene dicarboxylic acid product. Results of the analysis of the product are shown in Table 4.

Table 4

| | Ammonia OD value | Purity of methylbenzene dicarboxylic acid (% by weight) | Content of trimellitic acid (% by weight) | Content of cobalt (p.p.m) |
| --- | --- | --- | --- | --- |
| Starting material | (1.45×5)* | 84.5 | 9.8 | 28000 |
| Product of Example 5 | 0.175 | 99.2 | 0.35 | 12 |
| Product of Example 6 | 0.420 | 98.4 | 0.94 | 650 |
| Product of Example 7 | 0.670 | 98.2 | 1.05 | 980 |
| Product of Comparative Example 2 | (0.87×5)* | 94.1 | 3.57 | 10300 |

Note:
*The measurement was impossible by the method adopted in this invention; therefore, the measurement was conducted after diluting the sample liquor 10 times.

What we claim is:

1. A process for the preparation of a substantially refined methylbenzene dicarboxylic acid selected from methylterephthalic acid and 4-methylisophthalic acid, which comprises mixing a solid crude product of at least one methylbenzene dicarboxylic acid selected from the group consisting of methylterephthalic acid and 4-methylisophthalic acid, which is obtained by oxidizing pseudocumene with molecular oxygen in the presence of a cobalt catalyst, with acetic acid or an aqueous solution of acetic acid in an amount sufficient to dissolve the methylbenzene dicarboxylic acid substantially therein, the water content of said aqueous solution of acetic acid being up to 40% by weight; thereby dissolving the methylbenzene dicarboxylic acid in said acetic acid or said aqueous solution of acetic acid at a temperature of 80° – 220°C. while leaving substantially in the undissolved state impure coloring materials contained in said solid crude product; separating the undissolved solids from the resulting liquid by passing through a filtering layer which does not substantially allow particles of a size greater than 10 microns to pass therethrough while maintaining the temperature at 80° – 220°C.; and recovering the methylbenzene dicarboxylic acid in the form of solids from the remaining solution.

2. The process of claim 1, wherein said acetic acid or said aqueous solution of acetic acid is used in an amount 2 – 40 times as great as the amount of the methylbenzene dicarboxylic acid based on a weight basis.

3. The process of claim 1, wherein said solid crude product of the methylbenzene dicarboxylic acid contains as impure coloring material a cobalt complex of trimellitic acid.

4. The process of claim 1, wherein the methylbenzene dicarboxylic acid solution containing the undissolved solids is passed through a filtering layer which does not substantially allow particles of a size greater than 1 micron to pass therethrough, to thereby separate the undissolved solids from the solution.

5. The process of claim 1, wherein said aqueous solution of acetic acid contains 5 – 20% by weight of water.

6. A process for the preparation of a mixture of substantially refined methylterephthalic acid and 4-methylisophthalic acid, which comprises mixing a solid crude product of methylbenzene dicarboxylic acid, which is a mixture of methylterephthalic acid and 4-methylisophthalic acid obtained by oxidizing pseudocumene with molecular oxygen in the presence of a cobalt catalyst and containing as impure coloring material a cobalt complex of trimellitic acid, with 5 – 20 parts by weight, per part by weight of the methylbenzene dicarboxylic acid, of an aqueous solution of acetic acid having a water content of 5 – 20% by weight, thereby dissolving the methylbenzene dicarboxylic acid in said aqueous solution of acetic acid at a temperature of 110°–180°C. while leaving substantially in the undissolved state impure coloring materials contained in said solid crude product; separating the undissolved solids from the methylbenzene dicarboxylic acid solution by passing the solution containing the undissolved solids of impure coloring materials through a filtering layer which does not substantially allow particles of a size greater than 10 microns to pass therethrough; cooling the solution from which the undissolved solids have been separated, to thereby precipitate a mixture of methylterephthalic acid and 4-methylisophthalic acid; and recovering the precipitated mixture.

* * * * *